(12) United States Patent
Towfiq et al.

(10) Patent No.: US 11,695,916 B2
(45) Date of Patent: *Jul. 4, 2023

(54) VIDEO QUALITY ANALYSIS AND DETECTION OF BLOCKINESS, ARTIFACTS AND COLOR VARIATION FOR HIGH-VOLUME TESTING OF DEVICES USING AUTOMATED VIDEO TESTING SYSTEM

(71) Applicant: Promptlink Communications, Inc., Oceanside, CA (US)

(72) Inventors: Foad Towfiq, Vista, CA (US); Adib Towfiq, Vista, CA (US); Alexander Podarevsky, Oceanside, CA (US); Antonin Shtikhlaytner, Kiev (UA); Kyrylo Dzhos, Kiev (UA)

(73) Assignee: Promptlink Communications, Inc., Oceanside, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/700,345

(22) Filed: Mar. 21, 2022

(65) Prior Publication Data

US 2022/0360766 A1 Nov. 10, 2022

Related U.S. Application Data

(63) Continuation of application No. 13/998,949, filed on Dec. 26, 2013, now Pat. No. 11,284,063.

(60) Provisional application No. 61/848,256, filed on Dec. 28, 2012, provisional application No. 61/848,255, (Continued)

(51) Int. Cl.
H04N 21/235 (2011.01)
H04N 21/40 (2011.01)
H04N 17/04 (2006.01)
H04N 17/02 (2006.01)

(52) U.S. Cl.
CPC ............ *H04N 17/04* (2013.01); *H04N 17/02* (2013.01)

(58) Field of Classification Search
CPC .................................................. H04N 21/40
See application file for complete search history.

(56) References Cited

U.S. PATENT DOCUMENTS

| 4,450,335 A | 5/1984 | Shimizu et al. |
| 6,434,606 B1 * | 8/2002 | Borella ................. H04L 49/30 |
| | | 711/148 |

(Continued)

OTHER PUBLICATIONS

"19-Inch Rack—Wikipedia", Available Online at: <https://en.wikipedia.org/wiki/19-inch_rack>, Sep. 20, 2019, pp. 1-10.

(Continued)

*Primary Examiner* — Mushfikh I Alam
(74) *Attorney, Agent, or Firm* — DLA Piper LLP (US)

(57) ABSTRACT

A variety of device interfaces may be connected to a test platform in a fast and efficient manner using multi-pin cables and connectors to support high-volume processing of devices to be tested. The multi-pin cables and connectors may aggregate a plurality of specific device interfaces into a single cable that can be connected via a connector to a test shelf and via a connector to a test platform, reducing the time to setup for device testing and facilitating high-volume processing of devices to be tested.

5 Claims, 6 Drawing Sheets
(5 of 6 Drawing Sheet(s) Filed in Color)

Related U.S. Application Data filed on Dec. 28, 2012, provisional application No. 61/848,254, filed on Dec. 28, 2012.

(56) References Cited

U.S. PATENT DOCUMENTS

| | | | |
|---|---|---|---|
| 6,523,175 B1* | 2/2003 | Chan | H04N 5/46 |
| | | | 455/2.01 |
| 6,741,277 B1* | 5/2004 | Rau | H04N 17/004 |
| | | | 348/E17.005 |
| 6,754,622 B1* | 6/2004 | Beser | H04L 69/28 |
| | | | 704/226 |
| 6,957,169 B1* | 10/2005 | Van Horne | H04L 12/2898 |
| | | | 702/182 |
| 7,058,559 B1 | 6/2006 | Roeck et al. | |
| 7,668,397 B2* | 2/2010 | Le Dinh | H04N 19/14 |
| | | | 382/232 |
| 7,894,349 B2 | 2/2011 | Breed et al. | |
| 8,261,310 B2* | 9/2012 | Gupta | H04N 17/004 |
| | | | 725/38 |
| 9,419,678 B2* | 8/2016 | Vallestad | H04B 1/715 |
| 9,755,766 B2 | 9/2017 | Wadell et al. | |
| 10,419,957 B2 | 9/2019 | Towfiq et al. | |
| 2001/0011375 A1 | 8/2001 | Yun | |
| 2002/0091966 A1 | 7/2002 | Barton et al. | |
| 2003/0101391 A1 | 5/2003 | Man et al. | |
| 2003/0149991 A1* | 8/2003 | Reidhead | H04N 7/17309 |
| | | | 725/127 |
| 2003/0229695 A1 | 12/2003 | McBride | |
| 2004/0054771 A1 | 3/2004 | Roe et al. | |
| 2004/0160226 A1 | 8/2004 | Ewing et al. | |
| 2005/0060612 A1 | 3/2005 | Bohan | |
| 2005/0183130 A1 | 8/2005 | Sadja et al. | |
| 2005/0240852 A1 | 10/2005 | Inaba et al. | |
| 2006/0023845 A1 | 2/2006 | Brumble | |
| 2006/0085158 A1 | 4/2006 | Cakiner | |
| 2006/0101495 A1 | 5/2006 | Yoshida et al. | |
| 2006/0139490 A1* | 6/2006 | Fekkes | H04N 17/045 |
| | | | 348/E5.009 |
| 2007/0074261 A1 | 3/2007 | Bowen et al. | |
| 2007/0242420 A1 | 10/2007 | Hoshino et al. | |
| 2007/0247331 A1 | 10/2007 | Angelis et al. | |
| 2008/0038098 A1 | 2/2008 | Ito et al. | |
| 2008/0168520 A1* | 7/2008 | Vanderhoff | H04N 21/6543 |
| | | | 725/131 |
| 2009/0013372 A1* | 1/2009 | Oakes | H04N 21/64746 |
| | | | 725/139 |
| 2009/0089854 A1* | 4/2009 | Le | H04N 21/4424 |
| | | | 725/139 |
| 2009/0092053 A1 | 4/2009 | Olgaard | |
| 2009/0125960 A1* | 5/2009 | Cooprider | H04N 7/173 |
| | | | 725/111 |
| 2009/0168658 A1 | 7/2009 | Russell et al. | |
| 2009/0191880 A1* | 7/2009 | Wan | H04W 16/18 |
| | | | 455/446 |
| 2009/0195658 A1* | 8/2009 | Deschamp | H04N 17/04 |
| | | | 348/184 |
| 2009/0282446 A1* | 11/2009 | Breed | H04L 43/50 |
| | | | 725/111 |
| 2009/0290623 A1* | 11/2009 | Gray | H04L 1/243 |
| | | | 375/221 |
| 2009/0319249 A1 | 12/2009 | White et al. | |
| 2010/0146578 A1* | 6/2010 | Mallya | H04N 21/4147 |
| | | | 725/131 |
| 2010/0178875 A1 | 7/2010 | Oh et al. | |
| 2010/0180314 A1* | 7/2010 | Kim | H04N 21/64322 |
| | | | 348/192 |
| 2010/0261431 A1 | 10/2010 | Olgaard | |
| 2011/0069624 A1 | 3/2011 | Olgaard | |
| 2011/0072306 A1 | 3/2011 | Racey et al. | |
| 2011/0202645 A1 | 8/2011 | Abdelal et al. | |
| 2012/0126823 A1 | 5/2012 | Lussier | |
| 2012/0140081 A1 | 6/2012 | Clements | |
| 2012/0213259 A1* | 8/2012 | Renken | H04N 21/6168 |
| | | | 375/222 |
| 2012/0226462 A1 | 9/2012 | Rucker | |
| 2012/0246083 A1 | 9/2012 | Bowles et al. | |
| 2012/0278657 A1 | 11/2012 | Baker et al. | |
| 2012/0320784 A1 | 12/2012 | Edwards et al. | |
| 2013/0004179 A1* | 1/2013 | Nielsen | H04N 17/00 |
| | | | 398/115 |
| 2013/0007520 A1 | 1/2013 | Giammarresi et al. | |
| 2013/0128124 A1* | 5/2013 | Suzuki | G09G 5/008 |
| | | | 348/725 |
| 2013/0238308 A1 | 9/2013 | Grosso | |
| 2014/0181572 A1 | 6/2014 | Bradfield et al. | |
| 2014/0181849 A1* | 6/2014 | Casey | H04N 21/442 |
| | | | 725/14 |
| 2014/0233405 A1 | 8/2014 | Olgaard | |
| 2014/0240604 A1* | 8/2014 | Toba | H04N 5/44 |
| | | | 348/723 |
| 2014/0256268 A1 | 9/2014 | Olgaard | |
| 2014/0269470 A1 | 9/2014 | Hybertson et al. | |
| 2016/0140468 A1 | 5/2016 | Langborg-Hansen et al. | |
| 2017/0359626 A1* | 12/2017 | Chen | H04N 21/4667 |
| 2018/0098101 A1* | 4/2018 | Pont | H04N 21/44204 |
| 2018/0299502 A1 | 10/2018 | Towfiq | |
| 2019/0087422 A1* | 3/2019 | Balasubramanian | G06F 16/435 |
| 2019/0097910 A1 | 3/2019 | Towfiq | |
| 2019/0230387 A1* | 7/2019 | Gersten | G06F 16/783 |
| 2019/0364268 A1 | 11/2019 | Towfiq et al. | |
| 2020/0015104 A1 | 1/2020 | Towfiq et al. | |
| 2021/0037271 A1* | 2/2021 | Bikumala | G06V 10/70 |

OTHER PUBLICATIONS

Final Office Action received for U.S. Appl. No. 13/987,766, dated Jan. 14, 2020, 13 pages.

Final Office Action received for U.S. Appl. No. 13/998,949, dated Aug. 10, 2021, 14 pages.

Final Office Action received for U.S. Appl. No. 13/998,949, dated Jul. 15, 2020, 14 pages.

Final Office Action received for U.S. Appl. No. 14/544,387, dated Sep. 26, 2019, 17 pages.

International Preliminary Report on Patentability received for PCT Patent Application No. PCT/US2013/000201, dated Mar. 12, 2015, 6 pages.

International Preliminary Report on Patentability received for PCT Patent Application No. PCT/US2013/000244, dated Jun. 18, 2015, 6 pages.

International Search Report and Written Opinion received for PCT Patent Application No. PCT/US2013/000201, dated Apr. 8, 2014, 7 pages.

International Search Report and Written Opinion received for PCT Patent Application No. PCT/US2013/000244, dated Mar. 21, 2014, 7 pages.

International Search Report and Written Opinion received for PCT Patent Application No. PCT/US2013/000283, dated Mar. 13, 2014, 8 pages.

International Search Report and Written Opinion received for PCT Patent Application No. PCT/US2013/000284, dated Aug. 25, 2014, 8 pages.

International Search Report and Written Opinion received for PCT Patent Application No. PCT/US2013/000285, dated Mar. 13, 2014, 8 pages.

Non-Final Office Action received for U.S. Appl. No. 13/987,766, dated Apr. 11, 2019, 10 pages.

Non-Final Office Action received for U.S. Appl. No. 13/998,949, dated Dec. 20, 2019, 11 pages.

Non-Final Office Action received for U.S. Appl. No. 13/998,949, dated Feb. 2, 2021, 13 pages.

Non-Final Office Action received for U.S. Appl. No. 14/278,028, dated Mar. 29, 2018, 9 pages.

Non-Final Office Action received for U.S. Appl. No. 14/544,387, dated Mar. 11, 2019, 16 pages.

Notice of Allowance received for U.S. Appl. No. 13/998,949, dated Jan. 5, 2022, 14 pages.

(56) References Cited

OTHER PUBLICATIONS

Notice of Allowance received for U.S. Appl. No. 14/278,028, dated Jan. 9, 2019, 6 pages.
Notice of Allowance received for U.S. Appl. No. 14/278,028, dated May 2, 2019, 5 pages.
Supplemental Notice of Allowance received for U.S. Appl. No. 14/278,028, dated May 23, 2019, 2 pages.

* cited by examiner

VIDEO QUALITY ANALYSIS AND DETECTION OF BLOCKINESS, ARTIFACTS AND COLOR VARIATION FOR HIGH-VOLUME TESTING OF DEVICES USING AUTOMATED VIDEO TESTING SYSTEM

This disclosure relates generally to electronic device testing. More particularly, the disclosure relates to interfaces for electronic device testing. The present application is a continuation of U.S. patent application Ser. No. 13/998,949 filed on Dec. 26, 2013, entitled "Video Quality Analysis and Detection of Blockiness, Artifacts and Color Variation for High-Volume Testing of Devices Using Automated Video Testing System" which claims priority from U.S. Provisional Patent Application Ser. No. 61/848,254 filed on Dec. 28, 2012, entitled "Use Of Device Monitoring And Network Topology Data To Improve Functional Verification And Screening Of CPE Devices Returned From The Field," the entire disclosure of which is herein incorporated by reference. The present application also claims priority from U.S. Provisional Patent Application Ser. No. 61/848,255 filed on Dec. 28, 2012, entitled "Method For Video Quality Analysis And Detection of Blockiness, Artifacts and Color Variation for High-Volume Testing of Devices Using Automated Video Testing System," the entire disclosure of which is herein incorporated by reference. The present application also claims priority from U.S. Provisional Patent Application Ser. No. 61/848,256 filed on Dec. 28, 2012, entitled "Enhanced Network Management And Customer Premise Equipment (CPE) Monitoring By Using Behavior Measured From A Device Functional Verification And Screening System (Test Platform) In A Controlled Network Environment," the entire disclosure of which is herein incorporated by reference.

TECHNICAL FIELD

Background

Service providers, such as communications, connectivity, and content service providers, provide multimedia services, such as video, audio, telephony, data communications, wireless networking and related services to their subscribers by deploying devices at their customers' premises, and then connecting this equipment to the service provider's network and infrastructure. The deployed devices are generally called Customer Premise Equipment (CPE). For example, cable companies, more commonly known as multiple system operators (MSOs), deliver their service to customers by connecting a device, such as a set-top box or a cable modem, to their network, and this CPE device acts the service delivery mechanism for the subscriber.

Service providers purchase millions of CPE devices each year to use for delivering their subscription services to their customers. The devices can be TV set-top boxes, cable modems, Embedded Multimedia Terminal Adapters (EMTAs), wireless gateways, DSL modems, or devices that combine any of these and other capabilities in an integrated package. These and other devices are growing more complex as service providers aim to deliver more valuable services.

Service providers face an operational issue of managing their stock of new and used CPE devices and maximizing the investment in these CPE devices. Thousands of CPE devices must be tested on a daily basis. This issue is referred to as a High-Volume Device Testing issue. Further, in general, there are specific tests needed for each major functionality of the CPE devices, regardless of whether the functionality can be easily tested in high-volumes or not. Testing video capabilities of CPE devices may involve visual testing and evaluation of the effectiveness of video stream processing and presentation of video output. This kind of CPE device functionality has historically been tested manually by a test operator simply viewing the video results. Such video testing is cumbersome, prone to errors, and not scalable for high-volume processing. Instead, lacking automated testing methods, many service providers have relied on larger volumes of manual labor and manual visual evaluation to meet device testing quotas.

Some CPE devices support multiple interfaces to connect each device to various TVs, monitors, and other types of displays, including component, composite, S-video, and/or digital video interfaces. Testing each of the multiple video interfaces may be desirable because a CPE device may be connected to a display using one or more of the interfaces. Multiple interfaces may further complicate the High-Volume Device Testing-Issue.

Thus, there is a need for automated methods for performing video testing on CPE devices and to supply those automated methods in an environment that supports high-volume device testing.

SUMMARY OF THE DISCLOSURE

According to the disclosed subject matter, an automated video testing system may supply video to devices and may use computer video processing functionality on a high-volume device testing platform to perform automated video tests on CPE devices. The automated video testing system may use video streams that are transmitted to the CPE devices using the communications infrastructure of the high-volume device testing platform. Once transmitted, the video streams may be processed by the CPE devices and may be presented to each interface supported by the CPE devices. The high-volume device testing platform may then retrieve the processed and presented video streams and may use computer video processing functionality with evaluation algorithms to evaluate whether or not the CPE devices have successfully performed their expected video processing and presentation. Test operators may receive a test result instead of a visual pattern that they may have to evaluate manually. By using known specially generated video streams along with video processing algorithms that are related to the video streams, computer automation may be applied to the repetitive process of testing video functionality for high-volume device testing.

A video testing system may comprise a video source configured to generate a video signal selected from a plurality of video signals. Each video signal of the plurality of video signals may be associated with a respective evaluation algorithm. The video testing system may also comprise a video input interface in communication with a customer premise equipment (CPE) device and configured to receive a signal from the CPE device. A processor in communication with the video source and the video input interface may be configured to cause the video source to provide the selected video signal to the CPE device, to execute the evaluation algorithm associated with the selected video signal, to cause the video input interface to receive the signal from the CPE device, and to generate a test result.

A video testing method may comprise connecting a customer premise equipment (CPE) device to a video testing system and selecting a video signal from a plurality of video signals. Each video signal of the plurality of video signals may be associated with a respective evaluation algorithm. The selected video signal may be provided to the CPE device. The evaluation algorithm associated with the selected video signal may be executed. A signal may be received from the CPE device in the video testing signal. A test result may be generated.

BRIEF DESCRIPTION OF THE DRAWINGS

The patent or application file contains at least one drawing executed in color. Copies of this patent or patent application publication with color drawing(s) will be provided by the Office upon request and payment of the necessary fee. A more detailed understand may be had from the following description, given by way of example in conjunction with the accompanying drawings in which.

DETAILED DESCRIPTION

The disclosed subject matter is described with specificity to meet statutory requirements. However, the description itself is not intended to limit the scope of this patent. Rather, it is contemplated that the claimed subject matter might also be embodied in other ways, to include different steps or combinations of steps similar to the ones described in this document, in conjunction with other present or future technologies.

An automated video testing system may supply video to devices and may use computer video processing functionality operating on a high-volume device testing platform to perform automated video tests on CPE devices. This automated video testing system may include video streams that are transmitted to the CPE devise using the communications infrastructure of the high-volume device testing platform. Once transmitted, the video streams may be processed by the CPE devices and may be presented to each interface supported by the CPE devices. The high-volume device testing platform may then receive the processed and presented video streams and may use computer video processing functionality with evaluation algorithms to evaluate whether the CPE devices have successfully performed their expected video processing and presentation. Test operators may receive a test result instead of a visual pattern that they may have to evaluate manually. By using known, specially generated video streams along with video processing algorithms that are related to the video streams, the disclosed subject matter may apply computer automation to the process of testing video functionality for high-volume device testing.

Systems, methods, and instrumentalities embodying the disclosed subject matter may not need access to source video, e.g., reference video to perform comparison of received video streams to source or reference video. Instead, a model may be constructed of video tests that may be used on the network of the high-volume device testing platform without having access to the source video, yet produce reliable and accurate device functional verification results and indications of the CPE devices' ability to operate properly when deployed in the field.

The disclosed subject matter may implement aligned video tests and video test algorithms and video streams that supply the automated video testing system with tests to evaluate various aspects of the video processing and presentation performance of CPE devices. Each alignment may be a module for the test platform, e.g., matching video streams with test algorithms and functional verification testing results. One alignment may evaluate color quality, for example, while another may evaluate "blockiness" or the negative streams of poor video compression and decompression. Each alignment may include a video stream pattern that may test specific desired video characteristics supported by the CPE devices. Each video stream pattern may be adapted to the different resolutions supported by devices in the live network, such as, for example, NTSC, PAL, 720p, 1080i, and/or others, enabling complete coverage of all of the relevant video resolutions and protocols.

A plurality of alignments may be used to test all desired aspects of the video of the CPE devices. In another example, only one alignment may be selected to focus testing on just one aspect of the video of the CPE devices. New characteristics to be tested may be added, as may new devices, new interfaces, and the like, to the universal test platform. The alignments can be selected or unselected so that they may be used or unused, as needed.

An alignment of video tests may be used to evaluate video sharpness. The video streams may have low sharpness indicated by a slow motion reference video stream. A testing algorithm or testing algorithms may evaluate fast motion changes in the processed and presented video that may be indicative of sharpness defects in the video processing of the CPE device. The disclosed subject matter may use a video stream that does not contain sudden or sharp changes in the image, while the test algorithm may evaluate the received video stream for any sudden or sharp changes in image width or height, which may indicate CPE device defects in video buffering, decompression, processing, and/or presentation for a specific interface and/or at a specific resolution. A blockiness metric may track the number of added sudden/ sharp changes, which may be perceived as blocky images, and which may indicate poor or deficient video performance of the device under test.

An alignment of video tests may promote blocks or tiling of video to detect dynamic video artifacts such as freezing, tiling, and other frame buffer weaknesses. The video artifact may be a dynamic color grid reference video stream overlaid with "walking" or other dynamic text located in a cell of the grid and changing in each frame of the video stream.

An alignment of video tests may create a strenuous video processing in the device, e.g., artificially increasing or maximizing the video processing involved, through the use of a highly dynamic reference video stream and associated test and evaluation algorithms. This alignment of video tests may lead to faster testing and determination of operational functionality of the devices. CPE devices that pass this stress test are likely to pass all of the other more specific tests. The high volume testing process can use this test as an initial filtering mechanism for rapid separation of stocks of devices.

A dynamic video stream containing color bar stripes in a dynamic pattern of changing in a cycle may enable test and evaluation of the color correctness of the CPE device. The color bar stripes may be similar to those employed in the NTSC video standard of the Society of Motion Picture and Television Engineers (SMPTE) Color Bars. In addition to color correctness, this dynamic video stream may be used to detect luminosity.

An automated video testing system may perform automated video tests on CPE devices that are functionally verified on a high-volume device testing platform. This represents an innovation over manual visual inspection methods that have been used to test video capabilities of CPE devices. Automated video tests may comprise computer video processing functionality operating on a high-volume device testing platform along with known or controlled video streams that may be transmitted to the CPE devices using the communications infrastructure of the high-volume device testing platform.

Automated video tests may use dynamic video streams comprising sequences of video frames that may test a plurality of video processing characteristics of CPE devices. Transmitted video streams may be processed by the CPE devices connected to and operating on the test platform, causing the CPE devices to perform expected video processing and video presentation functions. Effective testing of video processing capabilities may occur as the results of device video processing are compared to anticipated results associated with the transmitted video streams.

Processed video streams may be processed by the CPE devices to each interface supported by the CPE devices, and the automated video testing method may repetitively evaluate the anticipated video results presented on each interface. The high-volume device testing platform may make use of communications infrastructure to receive the video streams that are processed and presented. The difference between the transmitted and the received video streams may be evaluated. The results of the evaluation may indicate the overall video processing health of the CPE devices.

Computer video processing functionality with evaluation algorithms may evaluate whether or not the CPE devices have successfully performed their expected video processing and presentation. This may support the automated generation of video test results, forming advancement over manual subjective evaluation of video testing. Test operators may receive a test result instead of, or in addition to, a visual pattern that they may need to evaluate manually. By using known video streams along with video processing algorithms that are related to the video streams, computer automation may be applied to the repetitive process of testing video functionality for high-volume device testing.

Figure 1:
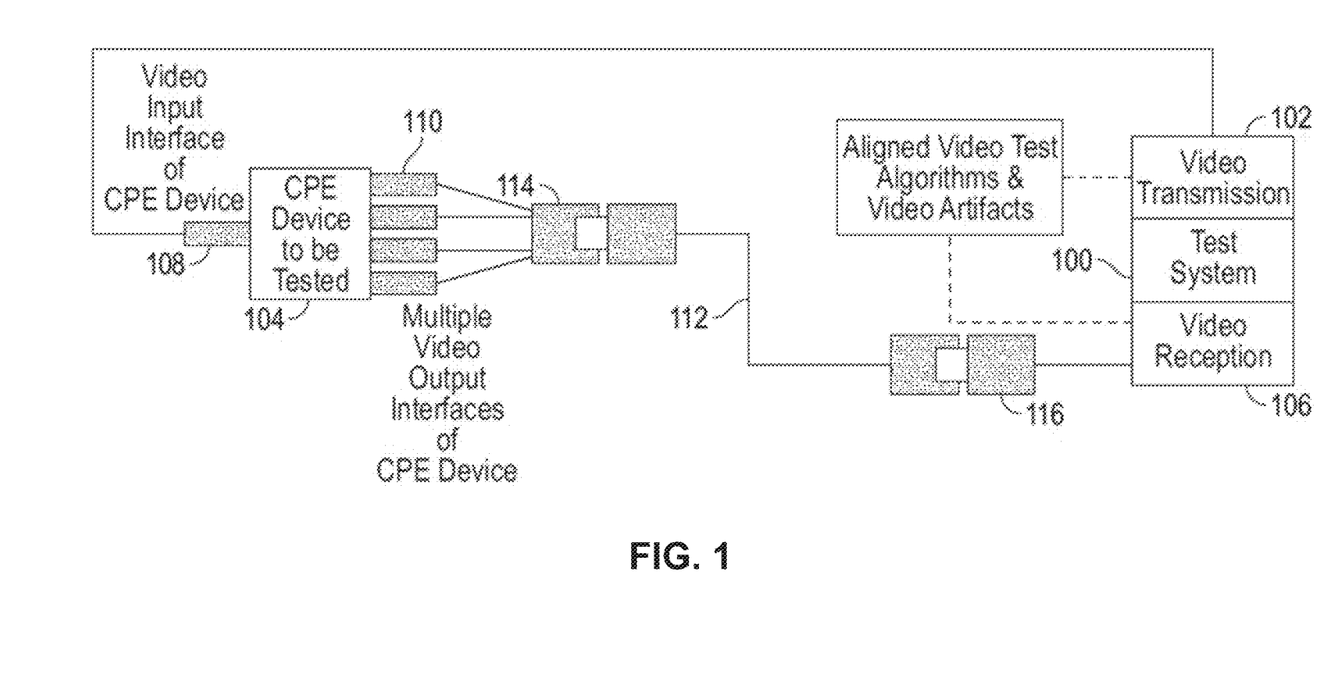
FIG. 1 is a diagram depicting an example of an automated video test system.

FIG. 1 illustrates an example of an automated video test system 100. The automated video test system 100 may comprise an interface 102 for transmitting audio and/or video signals to a CPE device 104 to be tested and an interface 106 for receiving audio and/or video signals from the CPE device 104. The interface 102 may be connected to the CPE device 104 via a video input interface 108 of the CPE device 104. The interface 106 may be connected to the CPE device via multiple video output interfaces 110 of the CPE device 104. The video output interfaces 110 may be connected to the interface 106 via a quick-connect cable 112 with quick-connect interfaces 114, 116, e.g., HDMI interfaces.

Aligned video tests and video test algorithms and video streams may supply the automated video testing system with tests to test and evaluate various aspects of the video processing and presentation performance of CPE devices. Because CPE devices with video capabilities may be complex devices with various video features and characteristics that may be built to operate in a wide variety of configurations and environments, it is unlikely that a single test could effectively test and evaluate a given CPE device. It is even more unlikely that a single test could effectively and test and evaluate multiple CPE devices, multiple models of CPE devices from a single manufacturer, or multiple models of CPE devices from multiple manufacturers. Modular test capabilities may facilitate broad coverage of video characteristics to be tested. Modular test capabilities may broadly apply tests for use with a universal test platform. A video test alignment may comprise a matched set of video streams and video test algorithms used to perform specific video characteristic tests.

An alignment may comprise a module for the test platform, e.g., matching video streams with test algorithms and functional verification testing results. For example, one alignment may evaluate color quality, while another may evaluate blockiness or the negative artifacts of poor video compression and/or decompression. A plurality of video test modules or alignments may support high-volume testing of CPE devices with video capabilities.

An alignment may comprise a video stream pattern that tests specific desired video characteristics supported by a CPE device. Considering that testing may be performed on received, processed, and presented video streams without comparison to a source video, an alignment may be a dynamic test pattern that can be independently evaluated for performance to anticipated levels. Each video stream pattern may be adapted to the different resolutions supported by devices in the live network, such as NTSC, PAL, 720p, 1080i, and/or others, enabling complete coverage of all of the relevant video resolutions and protocols.

The system may use a plurality of alignments for testing desired aspects of the video of the CPE devices, for example, performing a comprehensive video test on devices under test in preparation for decisions whether to be returned to the manufacturer for warranty repair or replacement, or to select only one alignment to focus testing on just one aspect of the video of the CPE devices, such as filtering field returns into pallets of good or bad devices.

The ability to add alignments that target new video characteristics to be tested or that add support for new devices or new interfaces, etc., to the universal test platform may increase the flexibility of the automated video test system. Flexibility may be further increased by the ability to select one or more of the alignments to be used for specific configurations of the automated video testing with the high-volume device testing process.

An alignment of video tests may be used to evaluate video sharpness. The video streams may have low sharpness indicated by a slow motion reference video stream. Testing algorithms may evaluate fast motion changes in the processed and presented video that may indicate sharpness defects in the video processing of the CPE device. Video processing defects in CPE devices may be measurable by evaluating differences between low sharpness input video streams and processed video streams that contain sudden or sharp changes in the images. A blockiness metric may be estimated as a number of added changes.

A source video may not be available for direct comparison. Testing may need to be performed on received, processed, and presented video streams without comparison to the source video. A video stream that does not contain sudden or sharp changes in the image may be used. The test algorithm may evaluate the received video stream for any sudden or sharp changes in image width or height, which may indicate CPE device defects in video buffering, decompression, processing, and/or presentation for a specific interface and/or at a specific resolution.

Figure 2:
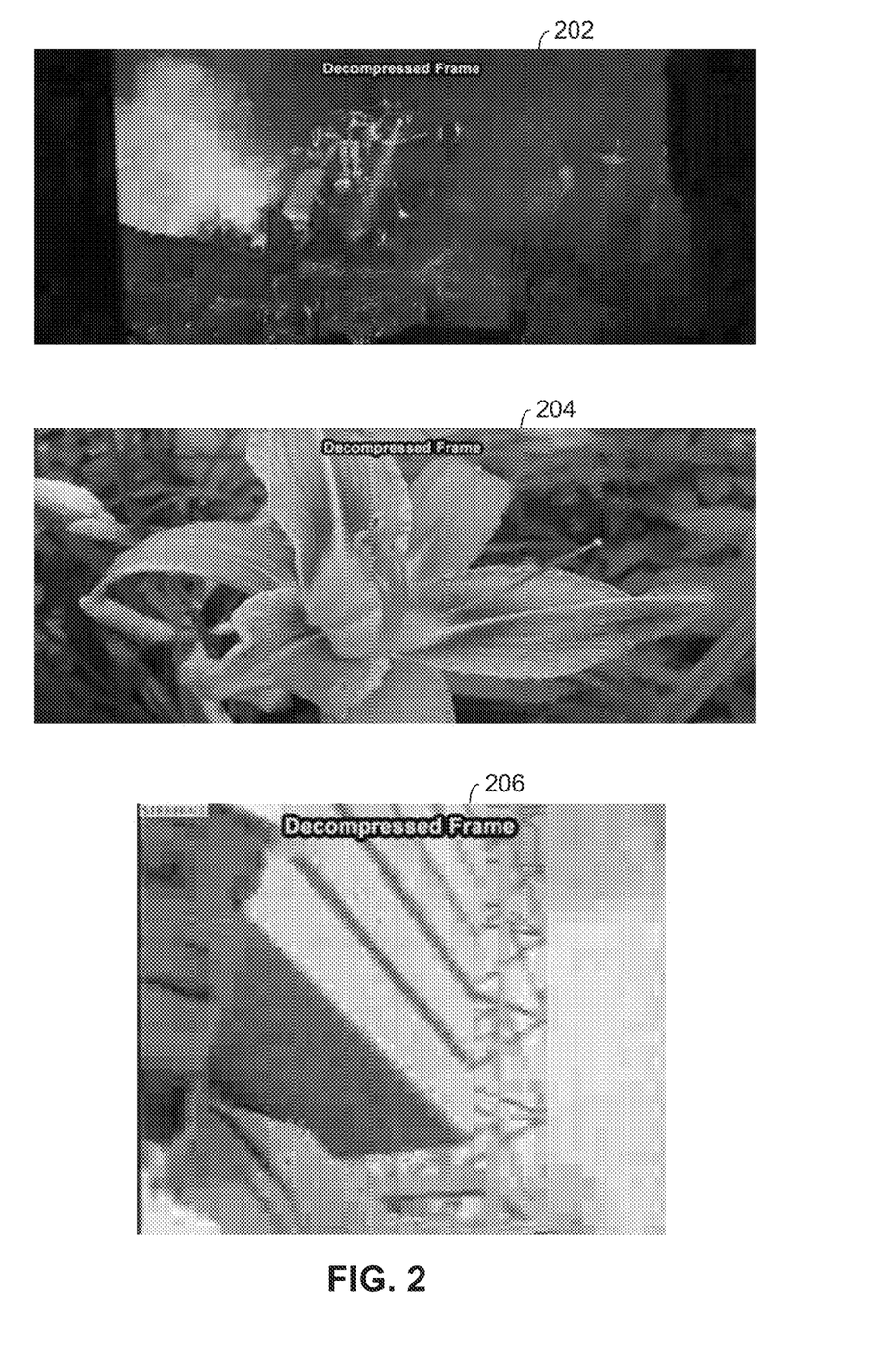
FIG. 2 is a diagram illustrating an example of blocky images for an automated video test system.
Figure 3:
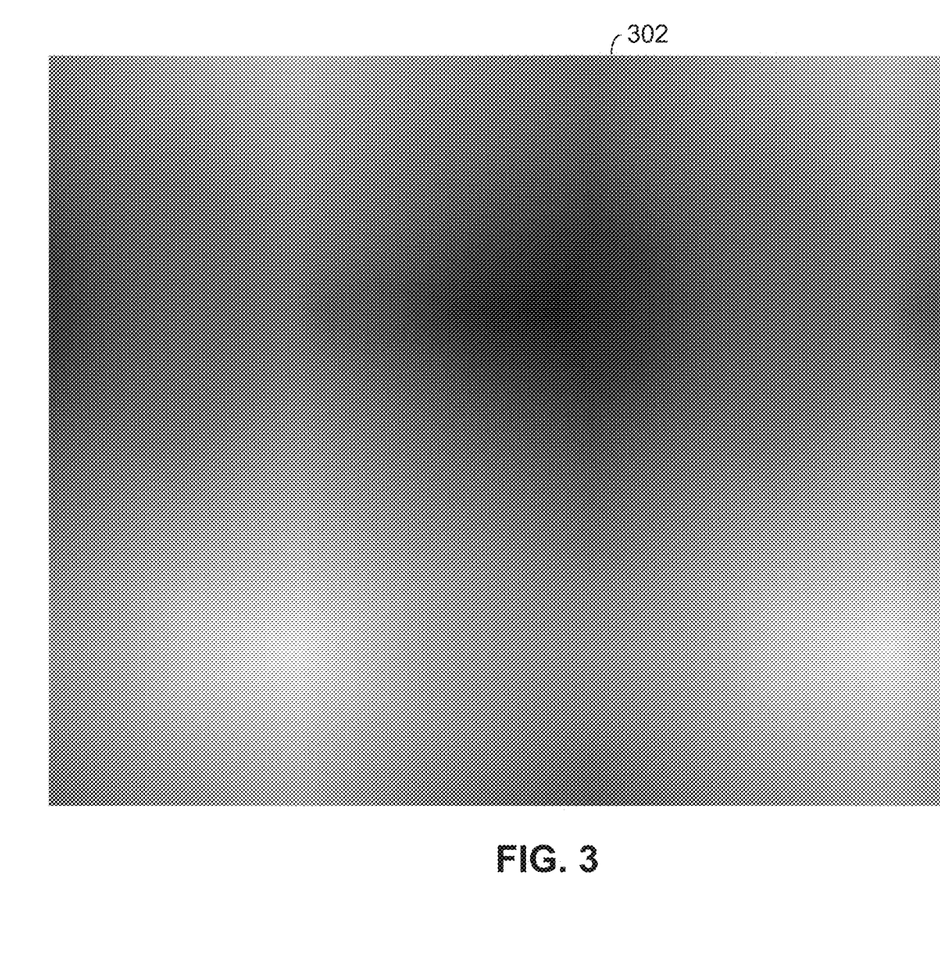
FIG. 3 is a diagram illustrating an example low sharpness reference image for an automated video test system.

FIG. 2 is a diagram illustrating a number of example blocky video images 202, 204, 206 that may indicate bandwidth, compression, and/or decompression issues or more fundamental deficiencies of the CPE device video processing. The methods, systems, and instrumentalities disclosed herein may be used in connection with a controlled test platform without bandwidth limitations. Video tests may detect blocky video and attribute it to the CPE device video processing. A low sharpness test may make use of a slow changing reference image 302 shown in FIG. 3. A low sharpness video stream as shown in FIG. 3 may make relatively few image changes over the course of many video frames. When the alignment is made between such a low sharpness video stream and a test algorithm evaluating image width and height of colors making up the video frame, anticipated "clean" video frame processing may be used, in which low sharpness may be tested across all parts of the screen. When high sharpness, which may be seen in blocky images, is found, video processing deficiencies in CPE devices may be detected. A blockiness metric may track the number of added sudden or sharp changes, which may be perceived as blocky images, and which may indicate poor or deficient video performance of the device under test.

Figure 4:
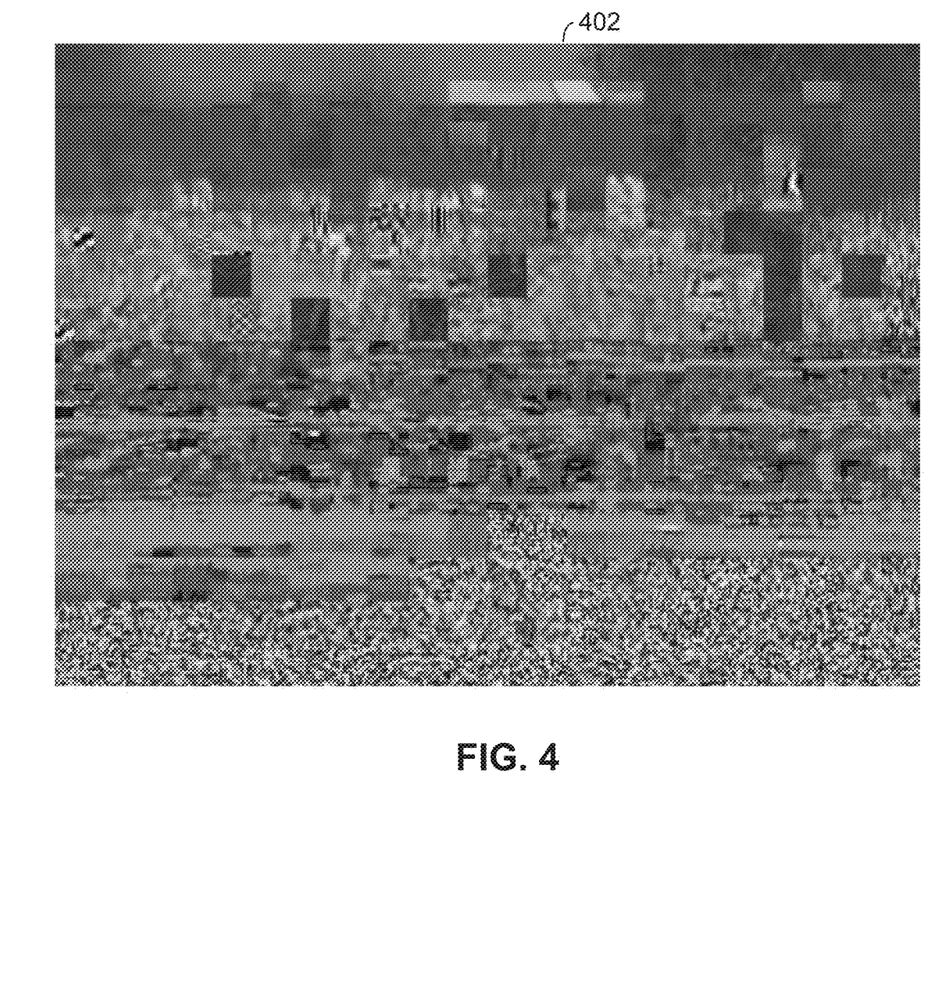
FIG. 4 is a diagram illustrating an example blockiness image that an automated video test system may seek using a dynamic color grid reference video stream and walking text.

An alignment of video tests may promote adverse blocks or tiling of video to detect dynamic video artifacts, such as freezing, tiling, and/or other video frame buffer weaknesses. The video artifact may comprise a dynamic color grid reference video stream overlaid with walking or dynamic text located in a cell of the grid and changing in each frame of the video stream. FIG. 4 illustrates an example video image 402 with the type of video defects that may occur due to poor dynamic video processing. Visible blocks may be seen throughout the image 402. These blocks may represent either inadequate reception of the original frames of the video stream and/or poor processing by the CPE device in receiving and/or decoding the video stream. Since the test platform may be built and/or calibrated to operate without limitations in the transmission bandwidth and/or throughput, this video test method may isolate poor video performance to the CPE device.

A dynamic color grid reference video stream may be used to produce known image colors in known locations in frames of the video stream. The color graphics image processing characteristics of the CPE device may be put under test. The dynamic color grid reference video stream may be overlaid with walking or dynamic text located in each cell of the grid. The walking or dynamic text may change in each frame of the video stream. By using an aligned test algorithm that uses optical character recognition to retrieve text values from each known cell, the test may produce environmental conditions that may promote blockiness as seen in the video image 402 of FIG. 4.

Figure 5:
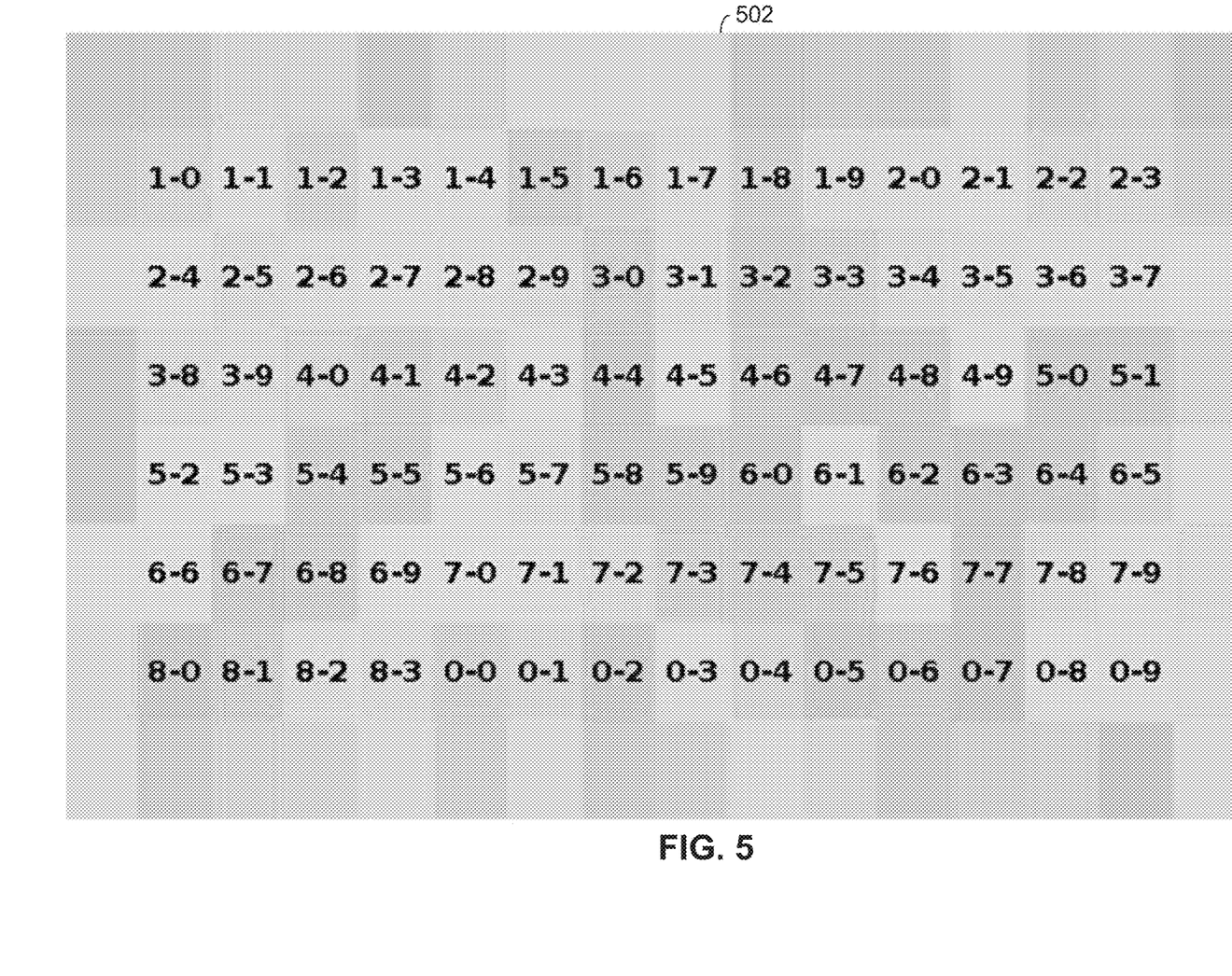
FIG. 5 is a diagram illustrating an example dynamic blocks range for an automated video test system.

FIG. 5 illustrates an example image 502 containing dynamic blocks for an automated video test system. The dynamic color grid reference video stream and overlaid walking text are shown in the example image 502. An alignment of video tests may create strenuous video processing in the device, which may artificially increase or maximize the video processing required, through the use of a highly dynamic reference video stream and associated test and evaluation algorithms. In consideration of video transmission buffering techniques, in which video stream processing may be economized by buffering both full frames and only the incremental changes in subsequent frames where the video stream is not changing rapidly, full plan incremental may be less strenuous, while repeatedly transmitting fully changing frames may be more strenuous. Constructed video streams that change the frames by a large, e.g., the maximum amount may cause devices under test to operate at a high performance level, e.g., the highest performance possible.

Stress testing devices in this way may exaggerate the identification of devices with marginal performance. Stress testing under high-volume testing methods may lead to better Reverse Logistics processes by reducing or eliminating inappropriate redeployment of marginal devices. The disclosed subject matter may lead to faster testing and determination of operational functionality of devices because CPE devices that pass the stress test are likely to pass the other, more specific, tests. Accordingly, the high-volume testing process can use stress testing as an initial filtering mechanism for rapidly separating stocks of devices.

Figure 6:
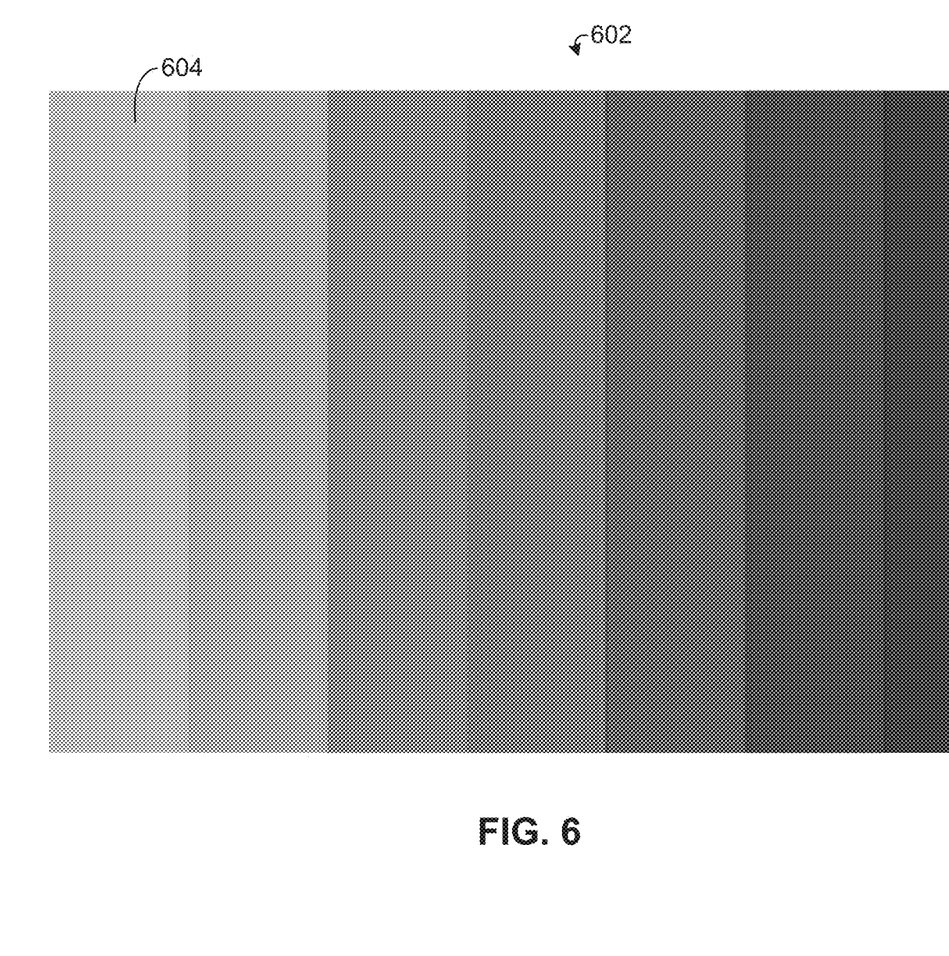
FIG. 6 is a diagram illustrating an example Society of Motion Picture and Television Engineers (SMPTE) Color Bars graphic that may be used for a dynamic video stream for a color correctness test.

Color correctness and luminosity of a CPE device can also be tested and/or evaluated. For example, a video standard, such as an NTSC video standard known as the Society of Motion Picture and Television Engineers (SMPTE) Color Bars may be improved and enhanced for application in high-volume device testing of CPE devices. The SMPTE Color Bars comprise a static color image used for calibrating video broadcasts with television of the video broadcast. A dynamic video stream may comprise the Color Bar stripes in a dynamic pattern of changing each specific color stripe in a repetitive cycle that may enable test and evaluation of the color correctness of the CPE device. FIG. 6 illustrates an example static image of an example dynamic video stream 602 that may comprise Color Bar stripes in such a dynamic pattern. In addition to color correctness, the dynamic video stream of changing color bars may be used to detect luminosity values and deficiencies in luminosity for CPE devices.

A dynamic color bar video stream, e.g., a dynamic video stream using the SMPTE Color Bars, may use a gray color bar 604 as a reference for indexing where other related color bars may be for each frame. Once the gray color bar index is set for each frame, a test algorithm may conduct measurements for the entire frame. For each measurement, a number of parameters may be evaluated. These parameters may include, but are not limited to, the average deviation from the original for each color, the maximum deviation from the original for each color, and/or the uniformity of the color across the screen for each color. A dynamic color bar video stream may be aligned with a related test algorithm to test and/or evaluate color correctness and/or luminosity produced by CPE devices while performing video stream processing.

As demonstrated by the foregoing discussion, the disclosed subject matter may provide certain advantages, particularly in the context of high-volume testing. Test operators may receive a test result instead of a visual pattern that they may have to evaluate manually. By using known specially generated video streams along with video processing algorithms that are related to the video streams, computer automation may be applied to the repetitive process of testing video functionality for high-volume device testing. This may improve the throughput of the system, as well as reduce or eliminate human error associated with manual evaluation of visual patterns.

It will be understood by those who practice the disclosed subject matter and those skilled in the art that various modifications and improvements may be made without departing from the spirit and scope of the disclosed subject matter. The scope of protection afforded is to be determined solely by the claims and by the breadth of interpretation allowed by law.

What is claimed is:

1. A method, comprising:

transmitting a low sharpness video stream to a CPE device;

receiving a processed video stream generated by the CPE device while processing the low sharpness video stream;

evaluating the processed video stream using an evaluation algorithm that evaluates frames of the processed video stream to determine a blockiness metric by tracking a number of sudden or sharp changes in the processed video stream; and determining a poor video processing performance by the CPE device when the calculated blockiness metric is outside of a predetermined threshold.

2. The method of claim 1, wherein the low sharpness video stream is a low sharpness, slow changing video stream.

3. The method of claim 1, wherein the evaluation algorithm also determines degradation of the processed video stream by evaluating consecutive frames in the processed video stream for the sudden or sharp changes in the processed video stream.

4. The method of claim 3, wherein the sudden or sharp changes are perceivable as one or more blocky images in the processed video stream, which indicate poor or deficient video performance of the CPE device.

5. The method of claim 1, wherein evaluating the video stream further comprises alignment of multiple video tests to promote adverse blocks or tiling of video to detect dynamic video artifacts such as freezing and/or tiling.

* * * * *